H. J. HUDDLE.
PEN AND PENCIL HOLDER.
APPLICATION FILED MAR. 12, 1910.
974,887.
Patented Nov. 8, 1910.
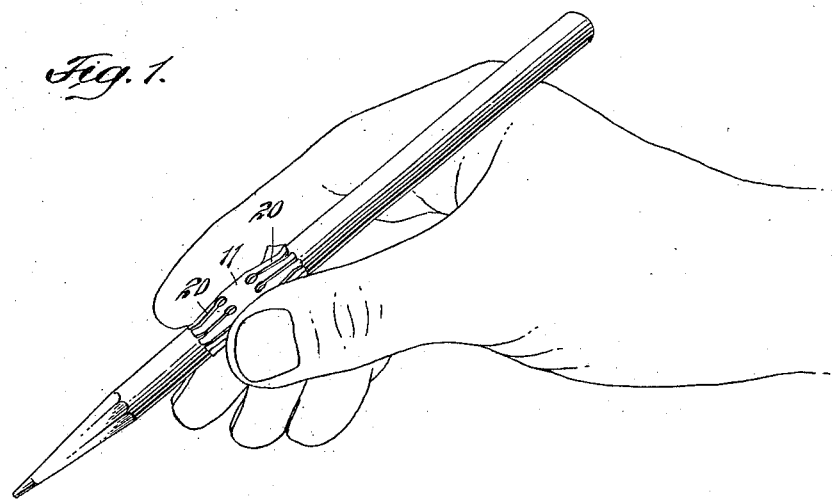
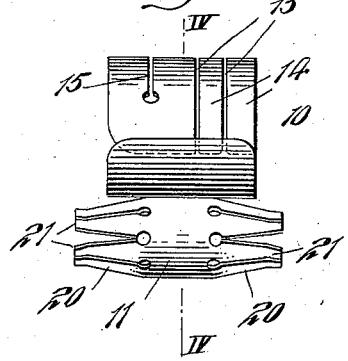
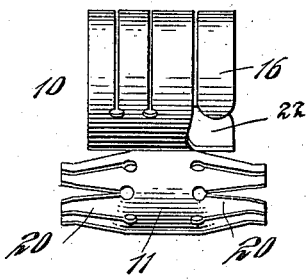
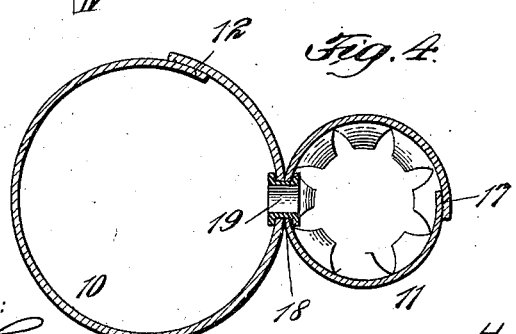
WITNESSES:
INVENTOR
H. J. Huddle
BY
J. A. E. Criswell
ATTORNEY

UNITED STATES PATENT OFFICE.

HERSCHEL J. HUDDLE, OF JERSEY CITY, NEW JERSEY.

PEN AND PENCIL HOLDER.

974,887.           Specification of Letters Patent.       Patented Nov. 8, 1910.

Application filed March 12, 1910. Serial No. 549,002.

*To all whom it may concern:*

Be it known that I, HERSCHEL J. HUDDLE, a citizen of the United States, and a resident of Jersey City, county of Hudson, and State of New Jersey, have invented certain new and useful Improvements in Pen and Pencil Holders, of which the following is a full, clear, and exact description.

This invention relates more particularly to a device adapted to be slipped over a finger and hold a pen or pencil in writing position.

The primary object of the invention is to provide a simple and efficient device which has a part thereof adapted to be slipped over one of the fingers and has a part thereof adapted to hold a pen, pencil or writing implement in the proper position for writing, and at the same time support the pen or pencil in such a way as will prevent what is known as writer's cramp which often occurs with those who are constantly writing or those writing for a long time, as for example, law and court stenographers; to provide a device that causes the writing implement to be properly held for long hand writing, and which actually compels the fore arm or whole movement with a satisfactory finger movement, and at the same time holds the writing implement so as to relieve the muscles from the strain of gripping the same and causes a perfect command of the implement.

Another object of the invention is to provide a device which is adapted to fit various fingers, which will hold writing implements of various sizes and kinds, and which permits proper movement of the fingers.

Other objects of the invention are to provide a device which serves to compel a beginner, as a child, to hold a pen or pencil in the proper position, which permits better effects and better formed characters with more freedom to be produced than is accomplished by the usual methods employed, and to provide a device which may be used by left-handed persons as well as persons who use their right hand while writing.

A further object of the invention is to provide a device which may be set permanently to any writing implement and may in addition thereto be used as a holder to attach or hook to the pocket for fountain pens and thus be always ready for operation, thus preserving the exact adjustment suitable to each individual user.

With these and other objects in view, the invention will be hereinafter more particularly described with reference to the accompanying drawings, which form a part of this specification, and will then be pointed out in the claims at the end of the description.

In the drawings, Figure 1 is a detail perspective view showing how the device may be used to hold a pencil. Fig. 2 is a plan view of the device looking at one side of the finger member. Fig. 3 is a view similar to Fig. 2 looking from the opposite side of that shown in Fig. 2; and Fig. 4 is an enlarged transverse sectional view taken on the line IV—IV of Fig. 2.

The device comprises primarily a finger member 10 and a pen, pencil or other implement holding member 11, and said members may be constructed in various ways and of any suitable material. As shown, the member 10 is of sheet metal substantially cylindrical in form and overlapping, as at 12, to adapt said member to fit different sizes of fingers and said member is slotted for a part of its circumference, as at 13, to provide a plurality of flexing fingers 14 at one end and at or near the other end a portion of the metal is cut away or removed as at 22, and extending from said cut-away portion partially around the circumference of the body is the slot 15, whereby a flexing finger or part 16 is provided to adapt the finger member 10 to flex and to assume the natural position and curvature of the finger and to hold the device in its natural writing position.

The member 11 is substantially cylindrical in form and is cut lengthwise thereof and provided with an overlapping portion 17 to permit the said member to open or close readily for different sizes of pens, pencils and the like, and said member 11 is pivoted, as at 18, to one side of the member 10 so that said member 11 may be moved relatively with respect to the member 10 to assume various angles according to the wishes of the writer, and to adapt the said device to be used either by a person who writes with the right hand or by one who uses the left hand, though ordinarily the pivoting of the two members together is done in such a way that when the relative movement of the members or angular arrangement thereof with respect to each other is secured, this said arrangement normally remains permanent as it requires some force to move said members with relation to each other. This is done in order that when the proper position of the members has been obtained this relation will remain permanent and suited to each individual user. An eye or other device 19 serves to hold the two members pivotally together and said member 11 has its ends tapering, as at 20, and slotted for a part of the length of said member at the opposite ends thereof to provide a plurality of spring or other fingers 21 which are adapted to clasp and hold the pen, pencil or like implement within the holder and to accommodate itself to different sizes of implements. It will be seen, therefore, that the device may have its member 10 readily slipped over the finger and the angular position of the member 11 changed to suit each particular user; that said member may be made of any suitable material, and is adapted to fit fingers of different sizes, also writing implements of different sizes; that said device will cause the pen, pencil or like implement to be held in the proper writing position, and to support the same in such a way that the pen or pencil will not have to be gripped by the fingers to hold the same, thus avoiding writer's cramp or other injurious effects often due to writing for a long time; that said device is particularly adapted for children and others to compel them to hold the writing implement in the proper position; and that a much better effect both for shading and for other purposes as well as the nature of the characters produced is obtained than is the case where such device is not used.

Having thus described my invention, I claim as new and desire to secure by Letters Patent:—

1. A device of the character described, comprising a member having a body portion of sheet metal substantially cylindrical in form with its edges overlapping, said body having a plurality of circumferential slots extending from one of said overlapping edges part way around the circumference of the body thereby providing a plurality of flexing fingers, a portion of said body cut away and having a slot extending from said cut away portion part way around the circumference of the body, whereby in use the device is made to assume the curvature of the finger, and a holding member having a cylindrical body having its opposite ends conical and longitudinally slotted for a part of the length of said member to provide a plurality of yielding fingers at each end of said holding member, and means for holding the two members together to permit relative adjustment thereof.

2. A device of the character described, comprising a member having a body portion of sheet metal substantially cylindrical in form with its edges overlapping, said body having a plurality of circumferential slots extending from one of said overlapping edges part way around the circumference of the body thereby providing a plurality of flexing fingers, a portion of said body cut away and having a slot extending from said cut away portion part way around the circumference of the body, whereby in use the device is made to assume the curvature of the finger, and a holding member having a cylindrical body having its opposite ends conical and longitudinally slotted for a part of the length of said member to provide a plurality of yielding fingers at each end of said holding member, and means for pivotally holding the two members together to permit relative adjustment thereof.

This specification signed and witnessed this 11th day of March A. D. 1910.

HERSCHEL J. HUDDLE.

Witnesses:
W. A. TOWNER, Jr.,
L. I. MAYER.